June 5, 1923.
W. P. THOMAS
FRUIT ELEVATOR
Filed Dec. 21, 1921
1,457,562
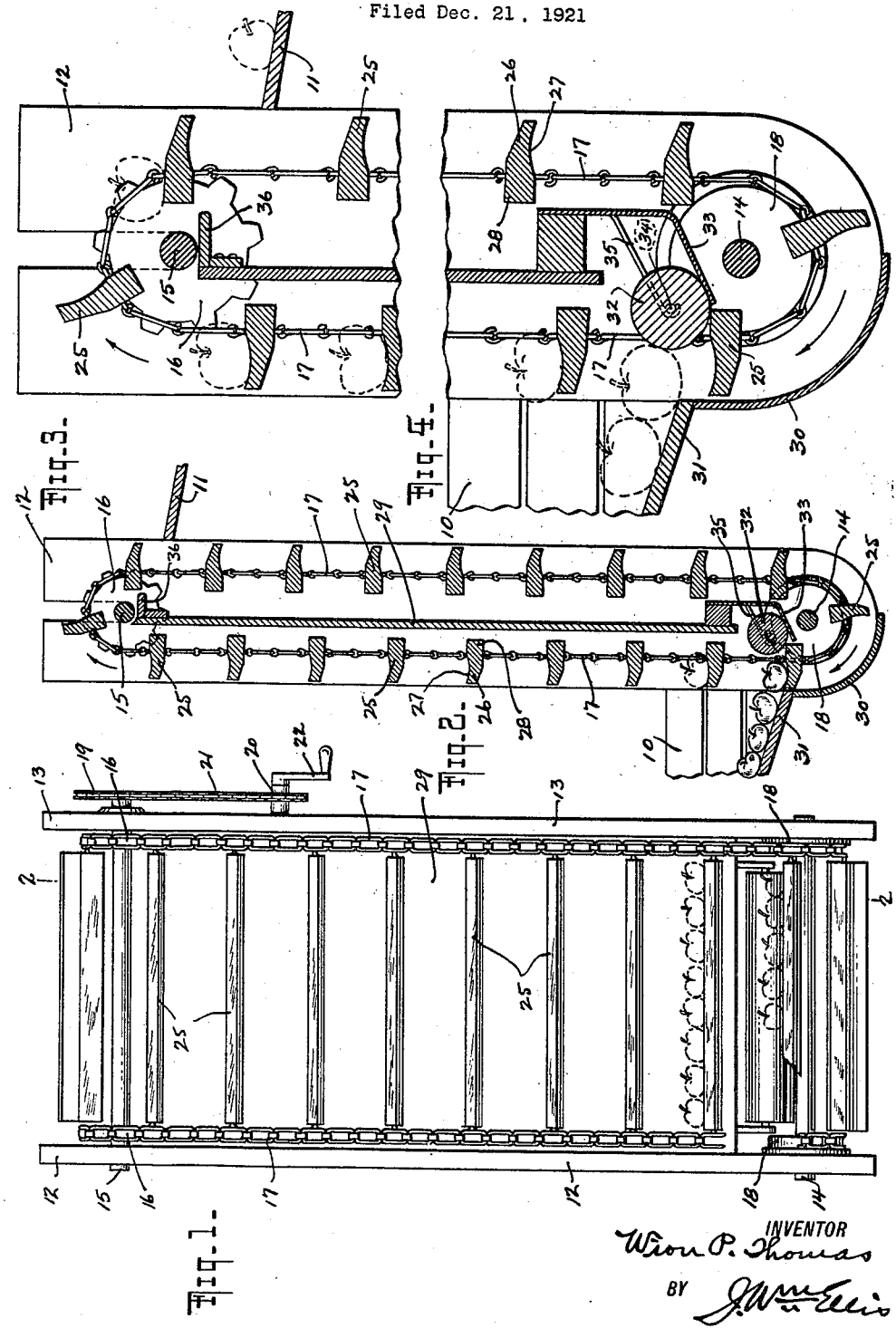

Patented June 5, 1923.

1,457,562

UNITED STATES PATENT OFFICE.

WION P. THOMAS, OF CARLTON, NEW YORK.

FRUIT ELEVATOR.

Application filed December 21, 1921. Serial No. 523,939.

*To all whom it may concern:*

Be it known that I, WION P. THOMAS, a citizen of the United States of America, and a resident of the town of Carlton, county of Orleans, and State of New York, have invented certain new and useful Improvements in Fruit Elevators, of which the following is a full, clear, and exact description.

My invention relates generally to elevators and more particularly to that type of elevator used for handling fruit and feeding it to a grader.

The principal object of my invention has been to provide a device of this nature which shall prevent the fruit from piling in between the slats.

My invention contemplates the use of a roller gate which causes the fruit to be held in a straight line until it is picked up by the approaching slat.

Furthermore, each of the slats of my elevator is grooved so that a single row of fruit will be carried by each slat. Each slat is also provided with a blank portion for decreasing the size of the space between it and the wall of the elevator, whereby small fruit will be prevented from being wedged between the slats and the wall.

Because of the vertical arrangement of my elevator and the grooves in the slats, the fruit will be held away from the central wall, and all rubbing will thereby be eliminated.

Moreover, my elevator is compact and requires very little floor space; and, because of its vertical arrangement, it will elevate to the highest point.

Moreover, the slats of my elevator are so positioned that as the fruit is discharged from one of them, the upper shaft of the device and the bottom side of the preceding slat will act as a chute for guiding the fruit to the feed board. Another object has been to provide means for dislodging the fruit, should it remain on the bottom side of any of the slats as they are descending.

The above objects and advantages have been accomplished by the device shown in the accompanying drawings, of which:

Fig. 1 is a front elevation of the complete elevator, portions of the lower part being broken away for clearness of illustration.

Fig. 2 is a sectional view taken on line 2—2 of Fig. 1.

Fig. 3 is an enlarged, fragmentary, sectional view of the upper portion of the elevator.

Fig. 4 is an enlarged, fragmentary, sectional view of the lower portion of the elevator.

For convenience of illustration, I have shown only a portion of the hopper 10 at the feed side of my elevator and only a portion of the feed board 11 at the discharge side thereof, it being obvious that the hopper will be arranged in a suitable and convenient position for placing the fruit therein, and that the feed board will be suitably connected to the grading machine, if such machine is being used.

My elevator comprises two side standards 12 and 13 in the lower ends of which is rotatably mounted a shaft 14. A shaft 15 is also carried at the upper ends of the standards. The shaft 15 carries two sprockets 16, one at each side thereof and within the standards 12 and 13. A conveyor belt is provided which comprises preferably two sprocket chains 17, engageable with each of the sprockets 16. This belt extends downwardly to the lower end of the elevator and is preferably passed over chain drums 18, secured to the shaft 14. In the drawings, I have shown one method of operating the device in which a sprocket wheel 19 is secured to the outer projecting end of the upper shaft 15, and connecting this sprocket wheel with a manually operated sprocket wheel 20 is a sprocket chain 21. The sprocket wheel 20 is rotatably carried by any fixed part of the device and is provided with an operating handle 22.

A plurality of slats 25 are carried by the sprocket chains 17 and each of them is provided with a forwardly extending portion 26 which has formed in its upper face a groove 27 for the reception and lodgment of the fruit being conveyed. Each slat is also provided with a blank portion 28 which extends inwardly some distance beyond the sprocket chain 17.

A wall 29 is arranged between the two passes of the chains and preferably located nearer to the upward pass of the chain than the downward pass thereof. The blank portion 28 of each slat is preferably of such a width that the space between the rear edge of each of the slats and the wall 29 will be closed against the passage of even the smallest fruit which is likely to be handled, whereby all jamming of the fruit between the slats and the wall is prevented and also the rubbing which would occur if the fruit is even in contact with the rear wall. This wall also prevents the fruit from passing beyond the operable range of the slats.

A boot 30 is arranged at the forward side of the lower ends of the standards 12 and 13, and its shape is in conformity to the line of movement of the slats as they pass around the lower shaft 14. The bottom 31 of the feed hopper 10 is preferably flush with the inner surface of the boot 30, and the outer edges of the slats 25 preferably come close to the boot and the edge of the bottom 31.

A roller gate 32 is arranged in the lower end of the device and just opposite the bottom 31 of the hopper. This roller is supported by means of a guide 33 which is inclined downwardly so that the roller will be normally held by gravity in the position shown in Fig. 4. A centrally arranged pin 34 is carried at each end of the roller and this pin engages with a stop 35, when the roller has assumed the position shown in Fig. 4. The stop is so proportioned that the roller will be permitted to close the space between it and the edge of the board 31 against the entrance of the fruit, as shown in Fig. 3. It will, however, hold the fruit in position and in a single row so that it may be picked up by the approaching slat, without permitting any piling or jamming of the fruit. As the approaching slat moves toward the opening between the roller and the board 31, the roller will be pushed backwardly out of the way as the fruit is being deposited upon the slat. When the slat with its charge of fruit has moved upwardly, the roller will immediately, upon being released by the movement of the slat, fall back into the position shown in Fig. 4, and hold the next row of fruit ready for the next slat. While any loaded slat is moving upwardly, its outer edge will hold the fruit back until the roller has had opportunity to move into position. Fig. 2 shows the roller moved part way out of position and the fruit resting upon the slat.

In Fig. 3 I show the position of the slat with respect to the feed board 11, when a row of fruit is being discharged from the slat. As here shown, the blank portion 28 of the slats narrows the space between the inner edges of the slats and the shaft 15 to such a degree that the fruit is prevented from passing between these openings. The fruit is carried across the opening and the bottom of the first descending slat will bridge the opening between the shaft and the feed board 11 and provide a chute for guiding the fruit to the feed board. In order to prevent fruit from resting upon the bottom of the descending slats and being conducted downwardly with the elevator, I provide a tipping member 36 extending laterally across the device and arranged immediately below the shaft 15. The outer edge of this member is in close proximity to the rear edges of the slats, and any fruit which is so lodged that it will remain on the bottom of the descending slat will come in contact with this member and be tipped off and caused to roll onto the feed board 11.

Instead of mounting the roller gate 32 on an inclined guide, the guide may be horizontally arranged and a spring employed to move the roller into operable position. These and other modifications of the details herein shown and described may be made without departing from the spirit of my invention or the scope of the appended claims; and, I do not, therefore, wish to be limited to the exact embodiment herein shown and described, the form described being merely a preferred embodiment thereof.

Having thus described my invention, what I claim is:

1. A fruit elevator comprising two conveyor chains, and a plurality of slats secured near their outer ends to the chains, each slat having a grooved portion extending forwardly from the chains, and also having a blank portion extending rearwardly from the chains.

2. A fruit elevator comprising two conveyor chains, and a plurality of slats secured near their outer ends to the chains, a wall arranged adjacent the upward pass of the chains, each slat having a grooved portion extending forwardly from the chains, and also having a blank portion extending rearwardly from the chains, whereby the blank portion decreases the width of the space between the grooved portion and the wall.

3. A fruit elevator comprising a conveyor belt, slats carried by the belt, and a tipping member arranged near the upper end of the belt and adjacent the inner edges of the slats on their downward pass.

4. A fruit elevator comprising a conveyor belt, a wall arranged adjacent the upward pass of the belt, slats carried by the belt, each slat having a grooved portion and a blank portion, the blank portion extending rearwardly for decreasing the width of the space between the grooved portion and the wall, and a tipping member arranged near the upper end of the belt and adjacent the inner edges of the slats on their downward pass.

5. A fruit elevator comprising a conveyor belt, slats carried by the belt, a boot at the bottom of the elevator, and a roller gate arranged adjacent the upper end of the boot for preventing the entrance of the fruit to the boot.

6. A fruit elevator comprising a conveyor belt, slats carried by the belt, a boot at the bottom of the elevator, a roller gate arranged adjacent the upper end of the boot for preventing the entrance of the fruit to the boot, and means for moving the roller to a predetermined position, whereby fruit will be prevented from entering the boot.

7. A fruit elevator comprising a conveyor belt, slats carried by the belt, a boot at the bottom of the elevator, a roller gate arranged adjacent the upper end of the boot for preventing the entrance of the fruit to the boot, and means for holding the roller in a predetermined position, whereby the fruit will be held in a row ready to be picked up by the approaching slat.

8. A fruit elevator comprising a conveyor belt, slats carried by the belt, a boot at the bottom of the elevator, a roller gate arranged adjacent the upper end of the boot for preventing the entrance of the fruit to the boot, a guide for the roller, and means for holding the roller in a predetermined position.

9. A fruit elevator comprising a conveyor belt, slats carried by the belt, a boot at the bottom of the elevator, a roller gate arranged adjacent the upper end of the boot for preventing the entrance of the fruit to the boot, an inclined guide for the roller, and a stop for holding the roller in a predetermined position.

10. A fruit elevator comprising a conveyor belt, slats carried by the belt, a tipping member arranged near the upper end of the belt, a boot arranged at the bottom of the belt, and a roller gate arranged adjacent the upper end of the boot for preventing the entrance of fruit to the boot.

11. A fruit elevator comprising a conveyor belt, a wall arranged adjacent the upward pass of the belt, a boot provided at the bottom of the belt, slats carried by the belt, each slat having a grooved portion and a blank portion, the blank portion extending rearwardly for decreasing the size of the space between the grooved portion and the wall, a roller gate arranged adjacent the upper end of the boot for preventing the entrance of fruit to the boot.

12. A fruit elevator comprising two conveyor chains, an upper shaft and a lower shaft for the conveyor chains, a wall arranged adjacent the upward pass of the chains and below the upper shaft, and a plurality of slats secured near their outer ends to the chains, each slat having a grooved portion and a blank portion, the blank portion extending rearwardly for decreasing the width of the space between the grooved portion, the wall and the upper shaft, whereby the openings between the blank portions of the slats and the upper shaft will be closed against the entrance of the fruit as it is being tipped from the uppermost ascending slat.

13. A fruit elevator comprising two conveyor chains, a feed board, an upper shaft and a lower shaft for the conveyor chains, a wall arranged adjacent the upward pass of the chains, and a plurality of slats secured near their outer ends to the chains, each slat having a grooved portion and a blank portion, the uppermost slat on the downward pass of the chains and the uppermost slat on the upward pass thereof bridging the openings between the slats and the upper shaft, whereby a chute is formed to conduct the fruit from the uppermost slat of the upward pass onto the feed board.

In testimony whereof, I have hereunto signed my name.

WION P. THOMAS.